(12) United States Patent
Waller et al.

(10) Patent No.: US 10,189,017 B2
(45) Date of Patent: *Jan. 29, 2019

(54) HONEYCOMB MONOLITH STRUCTURE

(71) Applicant: YARA INTERNATIONAL ASA, Oslo (NO)

(72) Inventors: David Waller, Porsgrunn (NO); Karl Isak Skau, Larvik (NO); Sang Baek Shin, Porsgrunn (NO); Bent Erlend Vigeland, Skien (NO)

(73) Assignee: YARA INTERNATIONAL ASA, Oslo (NO)

( * ) Notice: Subject to any disclaimer, the term of this patent is extended or adjusted under 35 U.S.C. 154(b) by 327 days.

This patent is subject to a terminal disclaimer.

(21) Appl. No.: 14/761,642

(22) PCT Filed: Jan. 24, 2014

(86) PCT No.: PCT/EP2014/051382
§ 371 (c)(1),
(2) Date: Jul. 17, 2015

(87) PCT Pub. No.: WO2014/114739
PCT Pub. Date: Jul. 31, 2014

(65) Prior Publication Data
US 2015/0336094 A1    Nov. 26, 2015

(30) Foreign Application Priority Data
Jan. 25, 2013    (NO) .................................. 20130144

(51) Int. Cl.
*B01J 35/04* (2006.01)
*B01D 53/86* (2006.01)
(Continued)

(52) U.S. Cl.
CPC ............ *B01J 35/04* (2013.01); *B01D 53/869* (2013.01); *B01D 53/90* (2013.01);
(Continued)

(58) Field of Classification Search
None
See application file for complete search history.

(56) References Cited

U.S. PATENT DOCUMENTS 3,502,596 A    3/1970 Sowards
4,863,895 A    9/1989 Behr
(Continued)

FOREIGN PATENT DOCUMENTS

CN    201815314    5/2011
CN    203228304    10/2013
(Continued)

OTHER PUBLICATIONS

Vincent et al. WO2010/149908A1—translated document (2010).*
(Continued)

*Primary Examiner* — Walter D. Griffin
*Assistant Examiner* — Jelitza M Perez
(74) *Attorney, Agent, or Firm* — Wenderoth, Lind & Ponack, L.L.P.

(57) ABSTRACT

Ho Honeycomb monolith structure, especially for use in mass transfer-limited processes or processes for the selective catalytic reduction (SCR) of nitrogen oxides, comprising: a plurality of cell walls defining a plurality of polygonal channels, the plurality of cell walls and channels extending in parallel along a common direction from an entrance end to an outlet end of the structure in the fluid flow direction. The transversal cross section of a polygonal channel has the shape of a convex elongated polygon, wherein at least 50% of the internal angles between two adjacent walls of the
(Continued)

convex polygon are above 90 degrees and wherein the cell diameter ratio $L_L/L_S$ is greater than 1.5.

26 Claims, 11 Drawing Sheets

(51) Int. Cl.
  *F01N 3/28* (2006.01)
  *B32B 3/12* (2006.01)
  *B01J 19/24* (2006.01)
  *B01D 53/90* (2006.01)
  *B01D 53/94* (2006.01)
  *C04B 38/00* (2006.01)
  *F01N 3/022* (2006.01)
  *B01J 20/28* (2006.01)
  *F01N 3/20* (2006.01)
  *C04B 111/00* (2006.01)

(52) U.S. Cl.
  CPC ........ *B01D 53/9431* (2013.01); *B01J 19/245* (2013.01); *B01J 20/28045* (2013.01); *B32B 3/12* (2013.01); *C04B 38/0009* (2013.01); *F01N 3/0222* (2013.01); *F01N 3/2828* (2013.01); *B01D 53/9418* (2013.01); *B01D 2201/62* (2013.01); *B01D 2253/3425* (2013.01); *B01J 2219/24* (2013.01); *B01J 2219/32296* (2013.01); *B32B 2605/08* (2013.01); *C04B 2111/0081* (2013.01); *F01N 3/2066* (2013.01); *F01N 2330/34* (2013.01); *Y02T 10/20* (2013.01); *Y10T 428/24149* (2015.01)

(56) References Cited

U.S. PATENT DOCUMENTS

| | | | |
|---|---|---|---|
| 5,714,228 A * | 2/1998 | Beckmeyer | B01D 53/885 422/177 |
| 5,866,080 A | 2/1999 | Day | |
| 6,258,436 B1 | 7/2001 | Pajonk et al. | |
| 7,718,246 B2 * | 5/2010 | Strauss | B22F 3/1112 428/118 |
| 2007/0227109 A1 | 10/2007 | Hong et al. | |
| 2007/0231533 A1 | 10/2007 | Aniolek et al. | |
| 2010/0062213 A1 | 3/2010 | Kondo | |
| 2011/0052454 A1* | 3/2011 | Kato | B01D 53/9477 422/171 |

FOREIGN PATENT DOCUMENTS

| | | | |
|---|---|---|---|
| DE | 20 2004 013 009 | 2/2006 | |
| EP | 0 636 410 | 2/1995 | |
| EP | 0 824 183 | 2/1998 | |
| EP | 1 787 705 | 5/2007 | |
| EP | 2 500 079 | 9/2012 | |
| FR | 2 946 892 | 12/2010 | |
| JP | 8-193512 | 7/1996 | |
| JP | 2012-514157 | 6/2012 | |
| KR | 10-2007-0038021 | 4/2007 | |
| WO | 2005/115589 | 12/2005 | |
| WO | 2010/075345 | 7/2010 | |
| WO | 2010/149908 | 12/2010 | |
| WO | WO 2010149908 A1 * | 12/2010 | ........... B01D 46/247 |
| WO | 2012/135387 | 10/2012 | |
| WO | 2013/111728 | 8/2013 | |

OTHER PUBLICATIONS

Nam et al. Modeling of Monolith Reactor Washcoated with CuZSM5 Catalyst for Removing NO from Diesel Engine by Urea. Ind. Eng. Chem. Res. 2006, pp. 5258-5267, http://pubs.acs.org/doi/pdf/10.1021/ie060199%2B.*
Nam et al. Modeling of Monolith Reactor Washcoated with CuZSM5 Catalyst for Removing NO from Diesel Engine by Urea. Ind. Eng. Chem. Res. ppp. 5258-5267 (Year: 2006).*
Preliminary Notice of Reasons in Rejection dated Jul. 5, 2016 in corresponding Japanese patent application No. 2015-554154.
International Search Report dated Apr. 4, 2014 in International Application No. PCT/EP2014/051382.
Written Opinion of the International Searching Authority dated Apr. 4, 2014 in International Application No. PCT/EP2014/051382.
Jim Kindinger, "Lightweight structural cores", In: "Composites", Dec. 1, 2001, ASM International, USA, XP055089000, ISBN: 978-0-87-170703-1, pp. 180-183.
Ju J et al., "Compliant hexagonal periodic lattice structures having both high shear strength and high shear strain", Materials and Design, London, GB, vol. 32, No. 2, Feb. 1, 2011, pp. 512-524, XP027431449.
European Patent Office communication dated Feb. 15, 2018 in corresponding European Patent No. 14 701 725.5.
International Search Report and Written Opinion of the International Searching Authority dated Dec. 18, 2015 in International Application No. PCT/EP2015/066734.
International Preliminary Report on Patentability dated Nov. 11, 2016 in International Application No. PCT/EP2015/066734.
Tomasic et al. "State-of-the-art in the monolithic catalysts/reactors", Applied Catalysis A: General, vol. 311, Jul. 2006, pp. 112-121.
English translation of Office Action dated May 14, 2018 in Korean Application No. 10-2017-7005068.
European Patent Office Action, dated Nov. 6, 2018 in corresponding European Patent Application No. 14 701 725.5.

* cited by examiner a　　　　　　　　　　　b c

HONEYCOMB MONOLITH STRUCTURE

BACKGROUND OF THE INVENTION

The invention concerns a novel honeycomb monolith structure, especially for use in mass transfer-limited processes. Honeycomb monolith structures comprise a plurality of cell walls defining a plurality of channels, or elongated cells, separated from each other by said cell walls, wherein the plurality of cell walls and channels extend in parallel along a common direction from an entrance end to the outlet end of the structure in the fluid flow direction. Monolith structures are usually given a complementary shape and placed side by side in a reactor, with their channels aligned along the flow direction in a reactor, completely covering the cross-sectional area of the reactor, with the consequence that the gas flowing through the reactor is made to pass entirely through the channels of the monolith structures.

Honeycomb monoliths are, for instance, utilised as structured chemical reactors, either by producing the whole monolith structure in a catalytic material, or by coating the surface of a monolith structure with a catalytically active material wherein the internal monolith structure walls contain an (inert) carrier material. Such monolith reactors are produced in a range of materials, typically different types of metals, ceramics or composites, wherein several production methods are known in the art. Common examples of production routes are extrusion and moulding.

A honeycomb monolith catalyst may be employed to induce and/or increase the rate of several types of chemical reactions such as synthesis of organic and inorganic compounds, decomposition of oxides, oxidation of compounds etc. Such monolith reactors can be produced with a large span in pitches and wall thickness, depending on demands on surface area, conversion, pressure drop, plugging resistance etc., as well as considerations involving monolith material strength and production limitations.

Among the advantages of monolith reactors are a low pressure drop, a relative high surface area, reasonable production costs, and the fact that they can be utilised in processes with gas mixtures containing particular material (dust, fly ash, soot etc.), such as effluent gases from incinerators.

The current invention concerns a novel honeycomb monolith structure having a novel honeycomb monolith channel design that can be used advantageously in monolith reactors for conducting several physicochemical processes, especially for processes with relative fast reactions where the rate-limiting step in the conversion is the mass-transfer to the surface by the reacting components. Mass transfer-limited processes may be catalytic, but may also be non-catalytic such as adsorbents, absorbents, and poison traps. Catalytic processes include any heterogeneous reaction that is mass transfer-limited, including, but not limited to, SCR, nitrous oxide decomposition, ammonia oxidation, natural gas processing, and water-gas shift reaction.

One example of the use of a honeycomb monolith catalyst is its use in NOx-removal from exhaust/flue gases wherein the flue gas often contains particular matter with varying particle size. Nitrogen oxides may be catalytically reduced to elementary nitrogen and water by the use of specific types of ceramic or metallic catalysts (called selective catalytic reduction, SCR). These catalysts can be extruded into a monolith structure. For the NOx removal reactions, the mass-transfer to the monolith surface is the rate-limiting step.

Common SCR catalysts are manufactured from various ceramic materials used as a carrier, such as titanium oxide, and the active catalytic components are usually either oxides of base metals, such as vanadium and tungsten, zeolites and various precious metals. Each catalyst component has advantages and disadvantages. Titanium oxide-based ceramic honeycomb SCR catalysts are often used for power generation, petro-chemical and industrial processing industries.

Honeycomb monolith structures are available wherein the transversal cross section of the channels has different shapes. Such a transversal cross section is often referred to as a cell. The most common commercially available monolith structures are honeycombs with channels having a square transverse cross section, as for example shown in International patent application WO 2012/135387 A1 (Cormetech, Inc., 2012). Also, catalytic converters with channels having a rectangular transverse cross section are known. Such a rectangular shape is, for example, disclosed in U.S. Pat. No. 5,866,080 A (Day, 1999) disclosing a rectangular transverse cross section with a width/height ratio of at least 1.2, preferably in the range of 1.5 to 2.5, and in U.S. Pat. No. 6,258,436 B1 (Siemens AG, 2001), disclosing a rectangular transverse cross section with a width:height ratio of 2:1.

Structures with hexagonal cells are also known. Chinese utility model CN201815314 relates to a honeycomb catalyst, provided with a regular hexagonal internal pore passage structure and used for SCR denitration technology. The regular hexagonal internal pore passage combines the advantages of a square internal pore passage and a circular internal pore passage. The plurality of flue gas flow internal pore passages distributed in honeycombed shapes are arranged in a square or hexagonal catalyst skeleton, and the transverse cross section of each internal pore passage is regular hexagonal, having a width:height ratio of about 1:1.

A disadvantage with the channels in prior art monolith structures is the high density of corners (corners per $cm^2$) and/or the fact that a majority of the corners are straight corners, i.e. corners wherein two adjacent walls meet at an angle of 90 degree. Examples are the ubiquitous square channel/cell geometry, as well as the hexagonal shaped channels/cells.

One of the challenges with the prior art is that the corners, especially sharp corners (e.g. corners of 90 degrees or less), have undesirable properties, such as a low chemical conversion, a higher pressure drop and are prone to plugging and fouling with particulate material in the gas stream, with subsequent and accompanying erosion problems.

Published patent documents also exist on smoothing walls and corners in monolith structures in order to obtain a structure with an increased structural strength, as is, for example, described in US patent application 2010/0062213 A1 (Denso Corporation, 2010), which discloses an hexagonal honeycomb structure with slightly curved walls and smoothed angles between two adjacent walls, and in U.S. Pat. No. 5,714,228 (General Motors Corporation, 1999) which discloses a hexagonal shape with rounded corners.

A monolith structure with only circular channels will have the main disadvantage that there is no "close packing" in the plane, which gives a much lower open frontal area (OFA) with circular channels compared to e.g. square channels. Low open frontal area leads, among other things, to an undesired high pressure drop and more frequent impact by fluidized particles in the incoming gas flow.

Monolith structures are also used in filters. In WO2010/149908 (Saint-Gobain, 2010) it is described a monolith structure for gas filtration comprising convex polygon shaped channels. The channels being alternately plugged at one or the other of the ends of the structure so as to define inlet channels and outlet channels for the gas to be filtered. The inlet and outlet channels have different shapes within the same structure. The walls may further comprise a catalyst. Such filter systems are also described in WO2005/115589 (Robert Bosch, 2005) and in US2007/0227109 (Ibiden, 2007). In such structures there will be different flow characteristic and different residence time in the different channels because of the different shapes. In the filters as described, a significant contribution to pressure drop will be the filter area formed by the cell walls between the inlet and outlet channels as the fluid has to travel through the walls. The aim of our invention is to limit the pressure drop in the fluid flow into and along the parallel channels combined with large surface areas and low risk of dust accumulation. This problem is not solved by the filters as described in the prior art.

In U.S. Pat. No. 3,502,596 (Sowards, 1965) it is described the use of a honeycomb structure as packing material in chemical process vessels and as catalyst supports in chemical reactors. The honeycombs themselves are regular $L_L/L_S=1$, but each element is cut as a cube or prism.

SUMMARY OF THE INVENTION

A problem with conventional honeycomb monolith structures is the undesirable large pressure drop (or back-pressure), defined as the pressure difference before and after the catalyst structure, which is especially important in systems where there is a relatively low overpressure, such as in systems with effluent gases, such as an incinerator or power plants.

Also, it is desirable to provide a honeycomb monolith structure which provides a large surface area for chemical reactions, has a high mechanical strength and stability and is simple to prepare.

Also, it is desirable to provide a honeycomb monolith structure which provides good dust attrition properties and less accumulation of particulate matter (dust), especially in the corners.

Hence, the main objective of the present invention is to provide a honeycomb monolith structure with a superior (i.e. low) pressure drop and dust attrition properties, as well as having equal or better chemical conversion rates compared to present honeycomb monolith structures. A further object is to obtain a structure with a high mechanical strength.

These and other objects of the invention are obtained with the honeycomb structure (also referred to as monolith structure or honeycomb monolith structure) as described in the appended claims.

BRIEF DESCRIPTION OF THE DRAWINGS

The honeycomb monolith structure according to the invention will be further described with reference to the accompanying drawings, wherein.

DETAILED DESCRIPTION OF THE INVENTION

Figure 1:
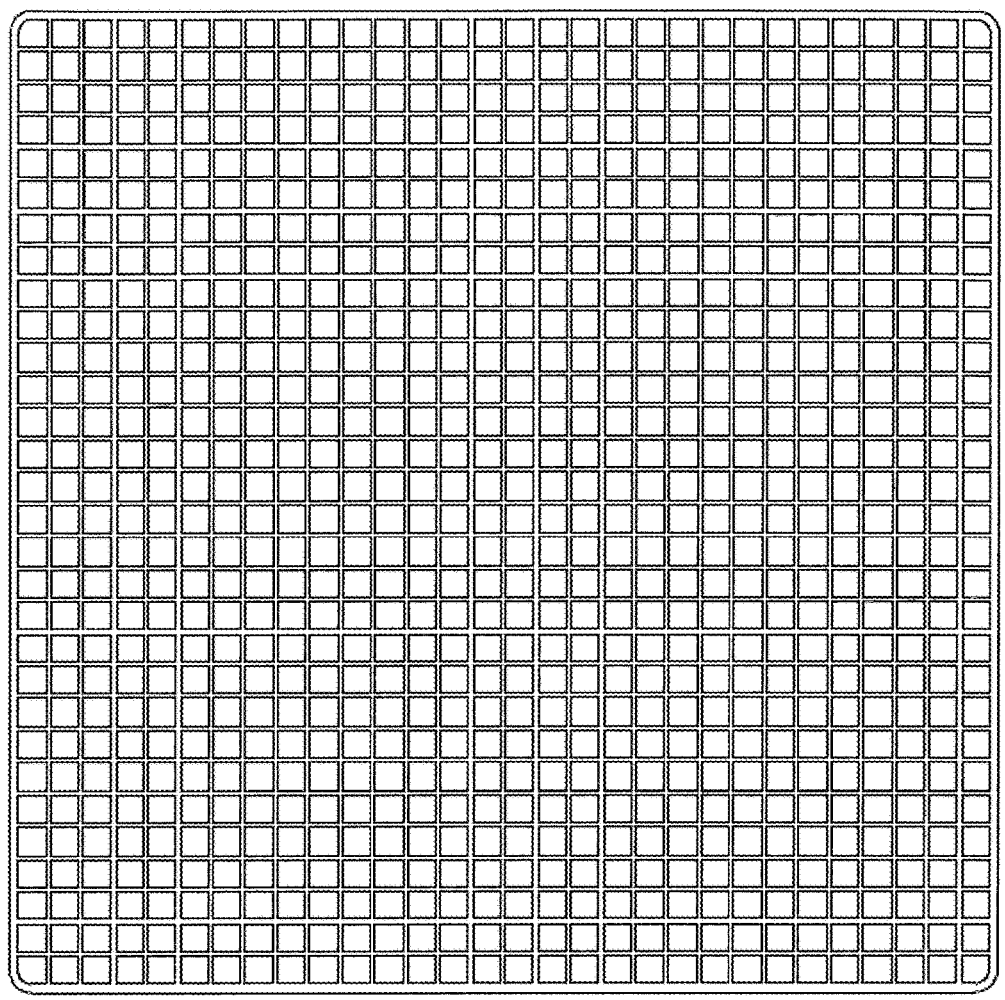
FIG. 1 shows a prior art honeycomb monolith with square channel geometry (wall thickness=0.7 mm, $L_S$=4.2 mm)

The invention is based on the finding that an improved performance can be gained for mass-transfer limited reactions from a multi-channel honeycomb monolith reactor with a modified channel transversal cross sectional shape compared to prior art reactors.

The honeycomb channel structure according to the present invention has a transversal cross sectional shape which is the shape of a convex polygon, wherein at least 50% of the internal angles between two adjacent walls are above 90 degrees and wherein the cell diameter ratio $L_L/L_S$ is greater than 1.5. This definition excludes the prior art rectangular shaped cell structures, but includes pentagonal, hexagonal, heptagonal, octagonal, nonagonal, decagonal and polygonal structures with a higher number of angles.

Within the context of the present invention, a honeycomb monolith structure is defined as a structure comprising a plurality of channels, or cells, or passages, separated by thin walls, extending in parallel along a common direction from an entrance end to a outlet end of the structure in the direction of a fluid, such as a liquid or a gas, flowing through said plurality of channels, or cells, or passages (longitudinal axis/fluid flow direction). The channels are open in both ends.

Within the context of the present invention, a convex polygon is defined as a polygon wherein all internal angles between two adjacent walls are in the range from 90° to 180°, this in contrast to a concave polygon, wherein one or more of the internal angles between two adjacent walls are below 90°.

Within the context of the present invention, the cell diameter ratio $L_L/L_S$ is defined as the ratio of the longest internal diameter ($L_L$) over the smallest internal diameter ($L_S$) of a cell, wherein both diameters are measured perpendicular to the common direction from an entrance end to an outlet end of the structure in the flow direction of a fluid, wherein both diameters are measured as the length of a straight line through the centre of gravity of the cell with a start- and endpoint at a wall delimiting the cell.

It is preferred that all or the majority of the channels in the honeycomb monolith structure have the same flow resistance (hydraulic diameter). With the majority or bulk of the channels it is meant most of the channels except for the channels in the periphery of the structure. Some of these will consist of parts of a cell as can be seen in the figures. It is preferred that the bulk of the cells have the same transversal cross-sectional shape and dimensions and that all the walls have the same thickness, however, it is recognized that there may be structural benefits when some of the walls in the monolith are thicker (increasing mechanically strength), or that the dimensions of the transversal cross-sectional shape may change along the common direction from an entrance end to an outlet end of the structure in the fluid flow direction. However, all the channels must be open in both ends and all or the main part of the channels have equal to nearly the same shape and the same flow resistance (hydraulic diameter).

Surprisingly, it has been found that by selecting an elongated shape for the channel cross-section according to the invention, it is possible to decrease the pressure drop significantly, compared to the prior art, while still maintaining or even improving the conversion rate. In addition, because of the increased hydraulic diameter of these channel designs, combined with the larger total internal angle (sum of all internal angles), it is found that the novel channel geometries also can improve, over prior art for monolith reactors, treating flue gasses which contain particular material (high dust, fly ash, soot) since the novel design has less dust depositions and higher erosion resistance.

The limitations on the longest diameter ($L_L$), substantially equal to the width of the cell, chosen for a given wall thickness, will in general be defined by the required material strength and structural properties of the monolith structure, i.e. dependent on the material chosen for the monolith structure walls. The limitation on the smallest diameter ($L_S$), substantially equal to the height of the cell, will in general be linked to the dimensions of any particular material in the gas flow.

According to the invention, a honeycomb monolith structure is provided, especially for use in mass transfer-limited processes, comprising a plurality of cell walls defining a plurality of polygonal channels, the plurality of cell walls and channels extending in parallel along a common direction from an entrance end to an outlet end of the structure in the fluid flow direction, wherein the transversal cross section of a polygonal channel has the shape of a convex polygon, wherein at least 50% of the internal angles between two adjacent walls of the convex polygon are above 90 degrees and wherein the cell diameter ratio $L_L/L_S$ is greater than 1.5. The channels are open in both ends. All or the main part of the channels have equal to nearly the same shape and the same flow resistance (hydraulic diameter).

According to one embodiment, more than 50% of the internal angles between two adjacent walls of the convex polygon are greater than 90 degrees.

According to one embodiment, all the internal angles between two adjacent walls of the convex polygon are greater than 90 degrees.

According to one embodiment, the cell diameter ratio $L_L/L_S$ is 2 or more, more preferably 2.5 or more. According to one embodiment, the cell diameter ratio $L_L/L_S$ ranges between 2 and 10, preferably 2 and 6, and most preferably between 2.5 and 4. In principle, the cell diameter ratio $L_L/L_S$ can have any value of more than 1.5. However, the maximum width is determined by the obtainable stability and mechanical strength of the elongated channels and hence, by the choice of material the walls are made of, the production method, etc.

According to one embodiment the wall thickness ranges between 0.01 and 5 mm, preferably between 0.1 and 1.5 mm, most preferably between 0.2 and 1.1 mm, including the boundary values.

According to one embodiment the $L_S$ ranges between 0.5 and 20 mm, preferably between 1 and 10 mm, most preferably between 2 and 6 mm, including the boundary values.

According to one embodiment the $L_L$ ranges between 0.75 and 200 mm, preferably between 1.5 and 100 mm, most preferably between 6 and 60 mm, including the boundary values.

According to one embodiment, the transversal cross section of a polygonal channel has a pentagonal, hexagonal or octagonal shape. An example of a pentagonal shape is illustrated in FIG. 3b, an example of a hexagonal shape is illustrated in FIG. 3c.

Figure 5A:
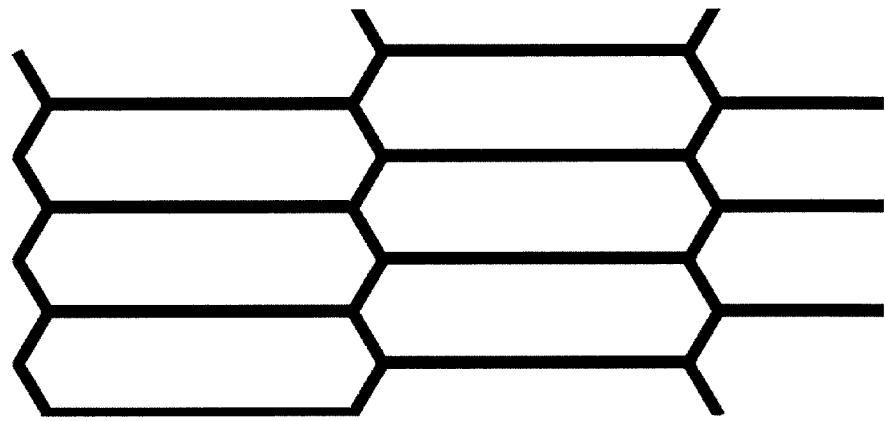
FIG. 5*a* shows elongated hexagons according to the present invention in closest packing
Figure 5B:
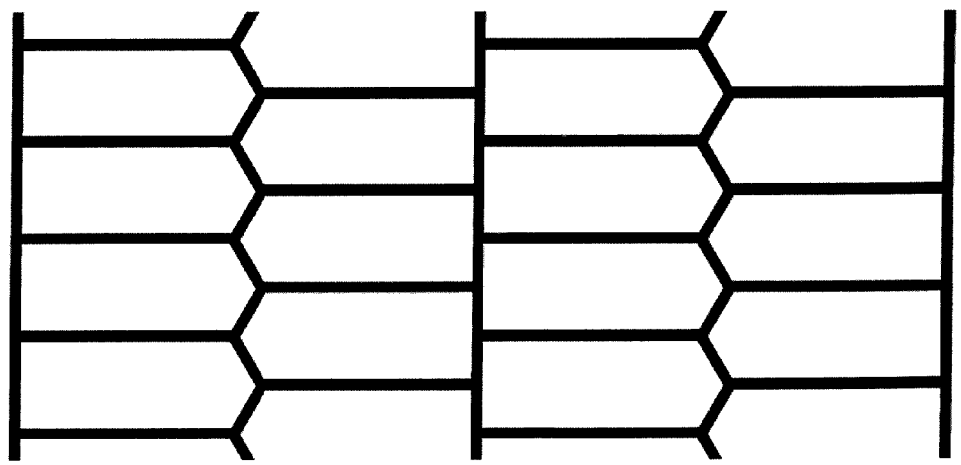
FIG. 5*b* shows elongated pentagons according to the present invention in closest packing

According to one embodiment, the convex polygons are arranged in a closest packing tessellation. FIG. 5a shows hexagons in closest packing and FIG. 5b shows pentagons in closest packing. Using a closest packing arrangement, the open frontal area (OFA) is maximized.

Figure 4:
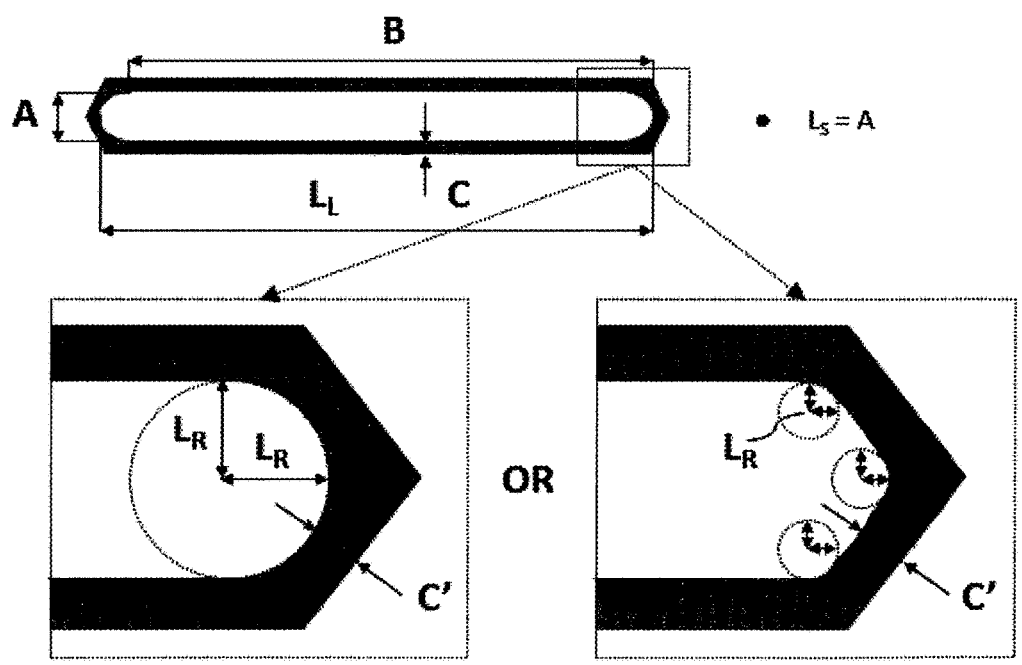
FIG. 4 shows a channel geometry as an elongated hexagon with rounded corners according to the present invention
Figure 6A:
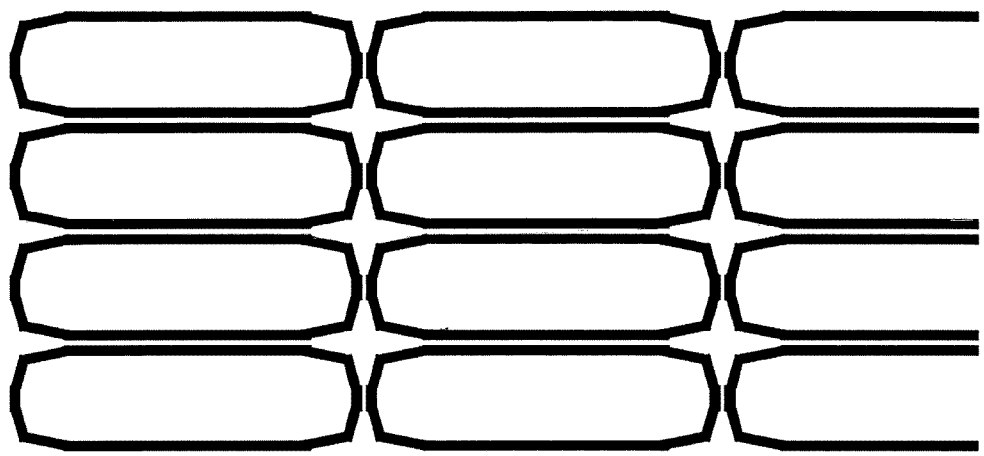
FIG. 6*a* shows elongated convex polygons with 12 internal corners according to the present invention
Figure 6B:
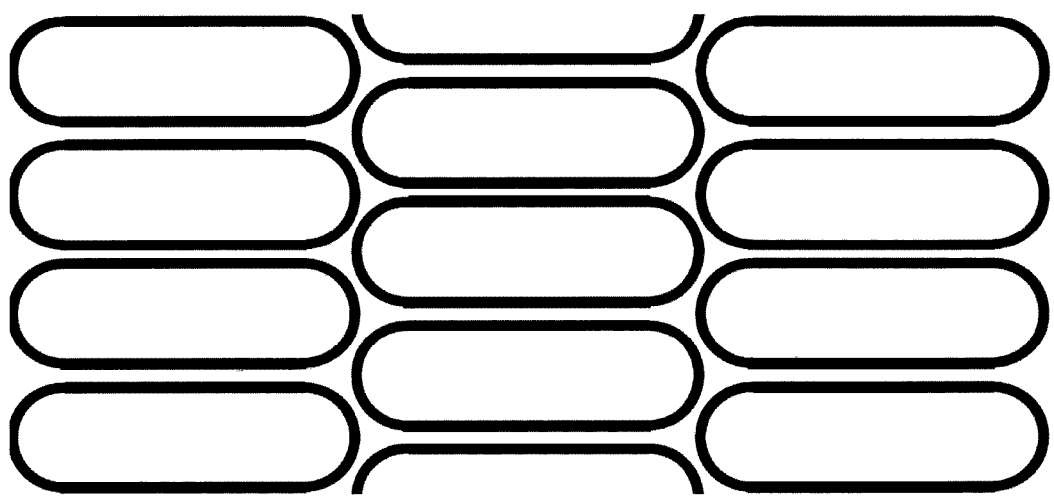
FIG. 6*b* shows elongated convex polygons wherein the corners have been rounded such that a smooth convex surface is obtained.
Figure 6C:
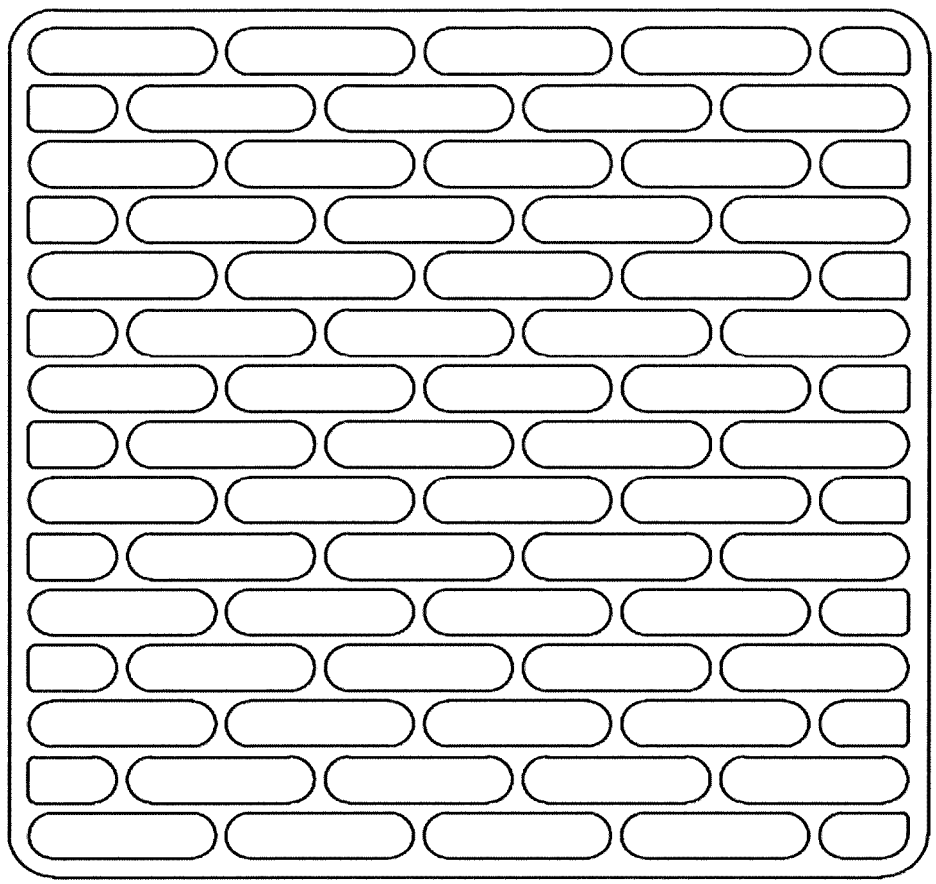
FIG. 6*c* shows elongated convex polygons with rounded corners (allentoids) in staggered configuration.

According to one embodiment, the longitudinal slots may also have one or more rounded internal corners. When an internal corner in the cross-section polygon is rounded, the radius of curvature ($L_R$) of the rounded corner is half or less than the smallest diameter ($L_S$), i.e. $L_R \leq \frac{1}{2} L_S$, as has been shown in FIG. 4 for two radius of curvature, in the left pane where $L_R$ is about half of $L_S$, and in the right pane where $L_R$ is much smaller than $L_S$. Preferably, all internal corners are rounded. In FIG. 6a it is shown elongated convex polygons with 12 internal corners, while FIG. 6b shows elongated convex polygons wherein the corners have been rounded such that a smooth convex surface is obtained. FIG. 6c shows elongated convex polygons with rounded corners (allentoids) in a staggered configuration.

Figure 9:
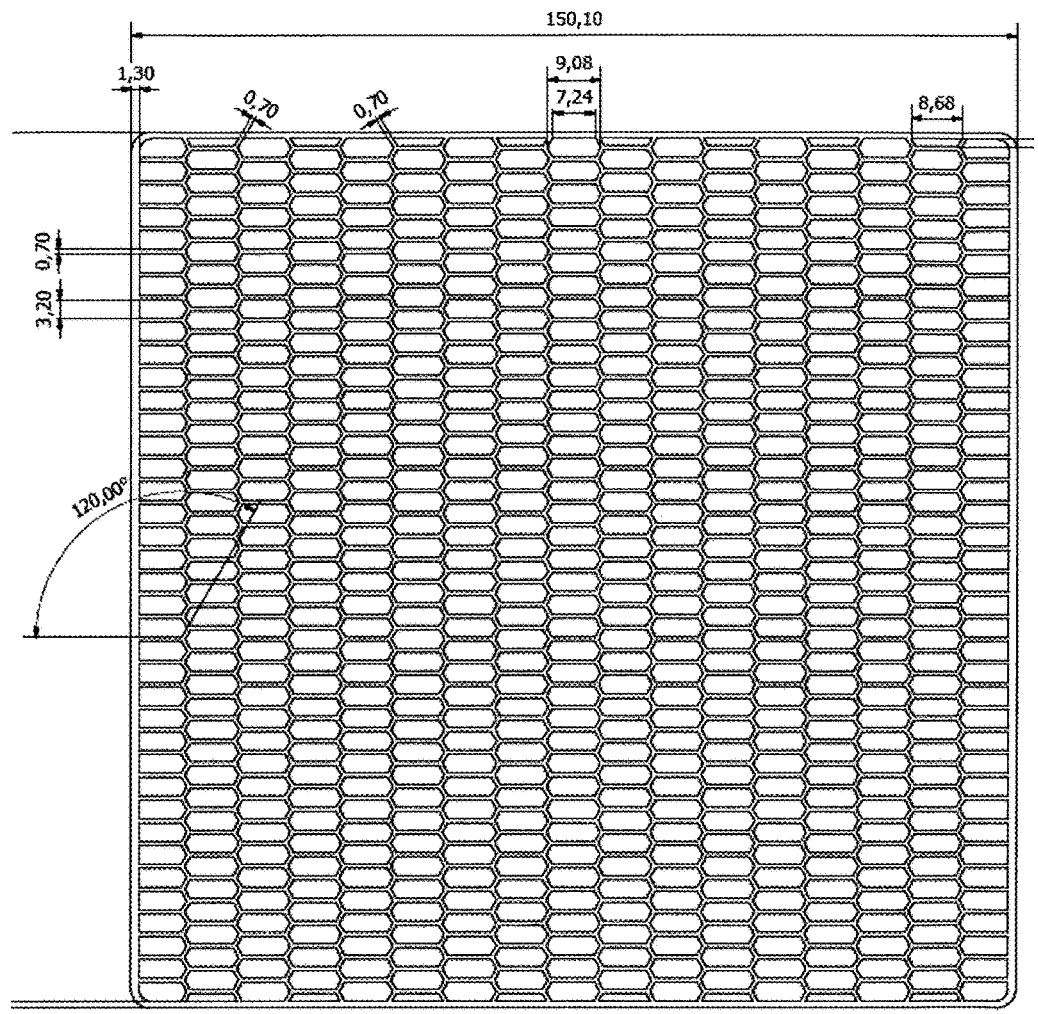
FIG. 9 shows one particular embodiment of a honeycomb monolith structure according to the invention with elongated hexagonal channels with an $L_L/L_S$ ratio of (9.08/3.20)=2.84, a cell wall thickness of 0.7 mm, and a cell density of 1.86 cells/cm$^2$.

According to one particular embodiment, shown in FIG. 9, the honeycomb monolith structure according to the invention has elongated hexagonal channels with an ratio of (9.08/3.20)=2.84, a cell wall thickness of 0.7 mm, and a cell density of 1.86 cells/cm².

Figure 10:
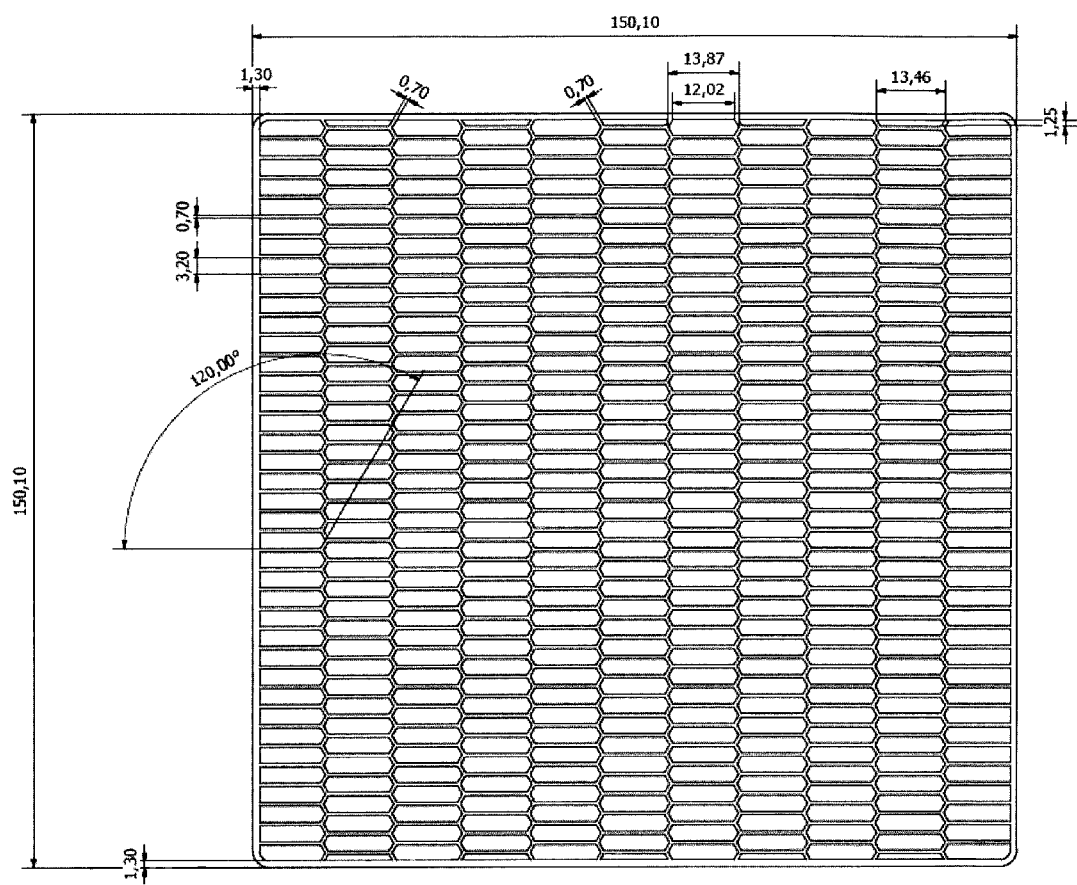
FIG. 10 shows another particular embodiment of a honeycomb monolith structure according to the invention with elongated hexagonal channels with an $L_L/L_S$ ratio of (13.87/3.20)=4.33, a cell wall thickness of 0.7 mm, and a cell density of 2.87 cells/cm$^2$.

According to another particular embodiment, shown in FIG. 10, the honeycomb monolith structure according to the invention has elongated hexagonal channels with an $L_L/L_S$ ratio of (13.87/3.20)=4.33, a cell wall thickness of 0.7 mm, and a cell density of 2.87 cells/cm².

The novel honeycomb monolith structure according to the invention may be a catalyst, or a support for one or more catalysts, or a solid for one or more non-catalytic processes, or a support for one or more chemicals used in a non-catalytic process. Preferably, the novel honeycomb monolith structure according to the invention may be used as a catalyst in selective catalytic reduction (SCR) of nitrogen oxides.

Multiple honeycomb monolith structures according to the invention may also be stacked along their common flow direction making a stacked structured reactor.

The honeycomb structure according to the invention can be produced using any suitable means known to the skilled person. In particular, a method of producing the honeycomb structure according to the invention comprises at least an extrusion moulding step, a cutting step, a drying step, and a firing step. In particular, the extrusion moulding step uses an extrusion moulding die having a plurality of slit grooves which are arranged corresponding to the shape of the arrangement of the cell walls in the polygonal cell honeycomb structure according to the invention.

In an extrusion moulding step, at first, a ceramic raw material powder is prepared having the desired composition. Next, water, ceramics binder and other additives of a predetermined amount are added to the ceramic material and subsequently mixed together in order to make the ceramic paste. This ceramic paste is extruded using the moulding die to produce the polygonal cell honeycomb structure according to the invention.

In the cutting step, the shaped body having a honeycomb structure is cut into a plurality of parts of a predetermined length.

Figure 2:
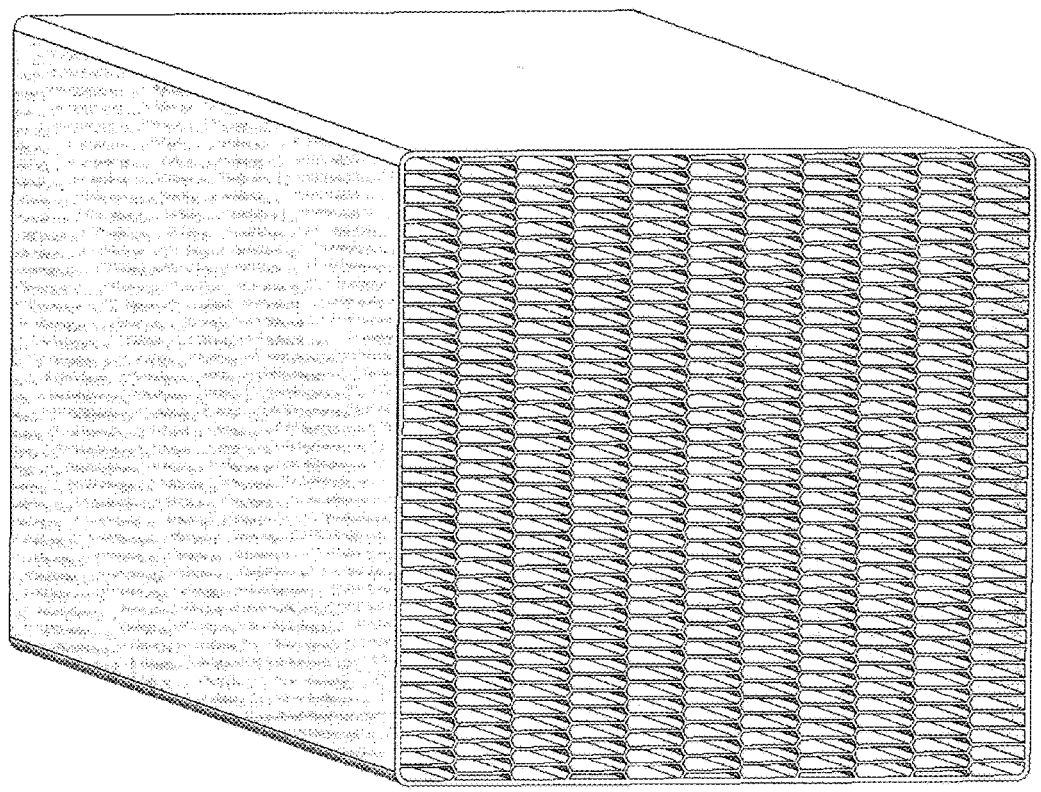
FIG. 2 shows a honeycomb monolith with an elongated hexagon channel geometry according to the present invention (wall thickness=0.7 mm, $L_S$=3.2 mm)

In the firing step, the dried honeycomb structure parts are fired at a predetermined temperature, for example at 1400° C. for a given ceramic material. After completion of the firing step, the polygonal honeycomb structure of the invention is produced, as shown in FIG. 2.

Alternatively, the structure can also be made by additive layer manufacturing, such as disclosed in WO 2012/032325 (Johnson Matthey PLC, 2012).

The invention will now be further illustrated with the following examples, without being bound to it.

EXAMPLES

Example 1: Conversion and Pressure Drop Properties Improvements (CFD Simulations (Computational Fluid Dynamics))

Figure 3A:
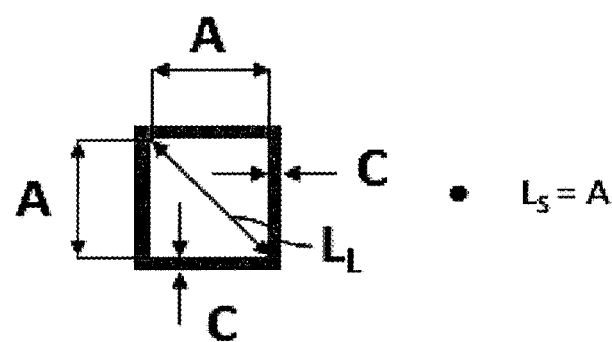
FIG. 3*a* shows a prior art square channel geometry with a given $L_L$ and $L_S$
Figure 3B:
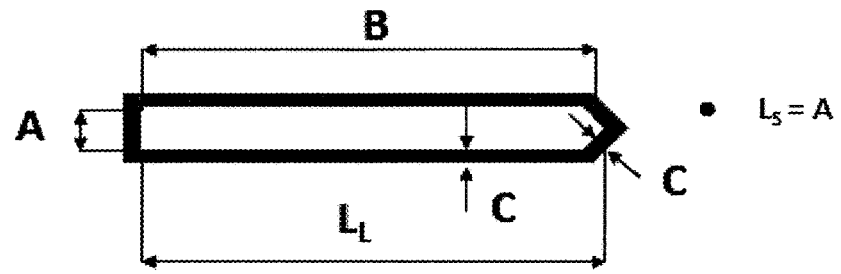
FIG. 3*b* shows a pentagon channel geometry according to the present invention
Figure 3C:
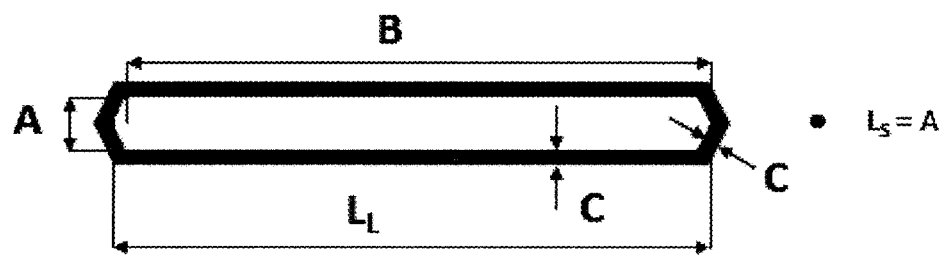
FIG. 3*c* shows a channel geometry as an elongated hexagon according to the present invention
Figure 7:
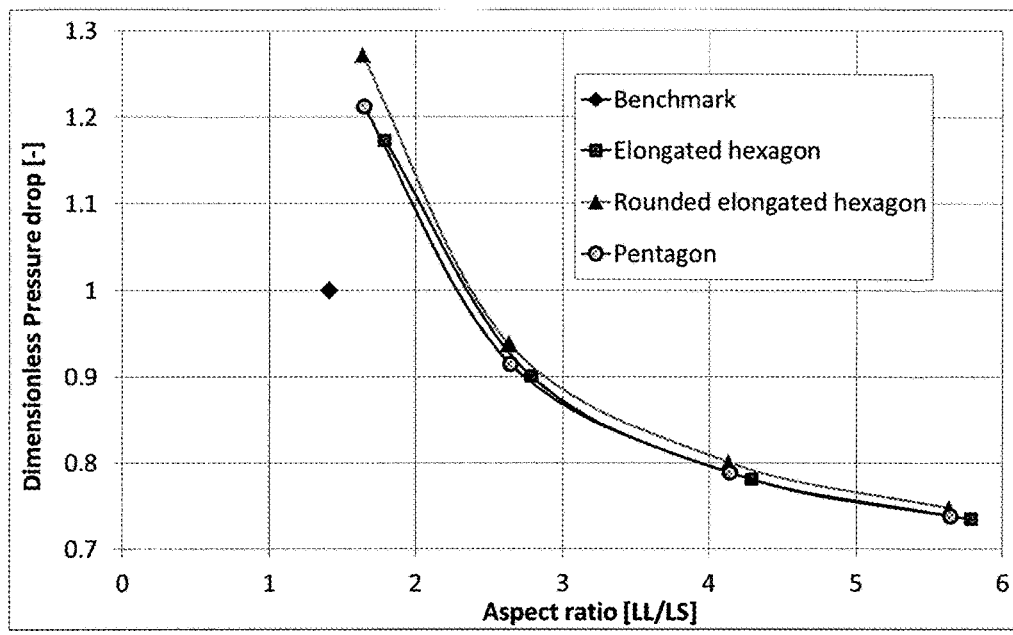
FIG. 7 shows the pressure drop as a function of the diameter ratio ($L_L/L_S$) and channel geometry, wherein the channel wall thickness is kept constant. Benchmark=Square channel geometry.
Figure 8:
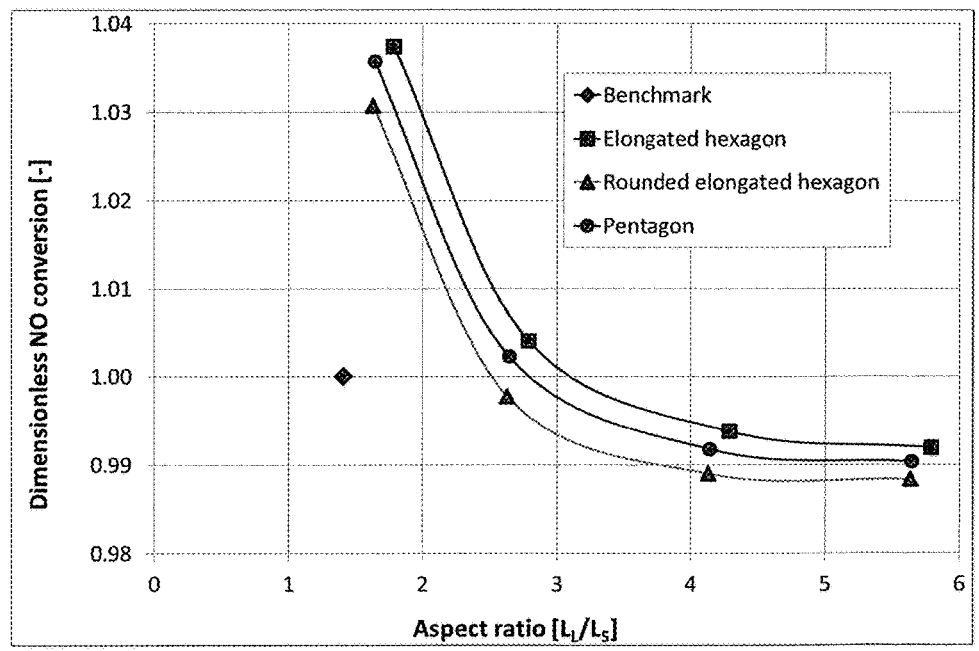
FIG. 8 shows chemical conversion as a function of the diameter ratio ($L_L/L_S$) and channel geometry, wherein the channel wall thickness is kept constant. Benchmark=Square channel geometry.

FIG. 7 and FIG. 8 show a lower pressure drop combined with an equal or increased NO-conversion for a range of cell diameter ratios ($L_L/L_S$) for a relevant example of an honeycomb monolith structure with elongated hexagons and pentagons as cells as displayed in FIGS. 5a, 5b and 6b, with the same wall thickness as the prior art benchmark square channel geometry (as shown in FIG. 1 and FIG. 3a), used for catalytically reducing nitrogen oxides (NO) to elementary nitrogen and water. The inner height is reduced from 4.2 mm in the benchmark square channel to 3.2 mm in the elongated hexagons and pentagon (i.e. by 25%). It can be seen that at a cell diameter ratio ($L_L/L_S$) of about 2.5, the pressure drop is much reduced compared to the pressure drop for the benchmark square channel geometry, and is decreasing further with increasing values of the cell diameter ratio ($L_L/L_S$) for all honeycomb monoliths according to the invention. Furthermore, the NO-conversion is at or near the same level (82%) as for the benchmark square channel geometry. It can also be observed that an even higher NO-conversion can be obtained with the honeycomb monolith structure than with the benchmark square channel geometry, at the expense of pressure drop, which might be of value for systems with a relative high overpressure.

Example 2: Increase in OFA/Reduction in Catalytic Volume

For the case in Example 1, where CFD simulations showed a decrease in the pressure drop while maintaining similar NO-conversion rates for an elongated hexagonal shaped channel with a cell diameter ratio ($L_L/L_S$)=2.5, additional benefits are recognized.

First, the open frontal area (OFA) is increased from 73.5% to 76.3% when comparing with the prior art benchmark square channel monolith (as shown in FIG. 1). The increase in OFA reduces the amount of frontal area hit by dust particle for high-dust flue gas, reducing the risk for dust depositions and fouling. Likewise, the hydraulic diameter is increased by 14% as well as an increase in all the internal angles from 90° to 120°, which again reduces the risk for dust depositions and also erosion.

Secondly, another benefit of the increased OFA, is that the total volume of catalyst in the honeycomb monolith is reduced by 7.5%, which reduces the material cost when extruding the honeycomb monolith structure according to the present invention.

Example 3: Fly-Ash Resistance

Experiments were carried out to demonstrate the dust attrition properties related to different geometry of the monolith. Comparative studies were carried out on monoliths produced in the same material and with the same production method where one had a benchmark structure with square channel geometry ($L_S$=4.2 mm) and a monolith with elongated hexagonal channel geometry ($L_L/L_S$=3.2). The experiments related to fouling and attrition were performed on equipment where air containing solid fly-ash particles at a relevant range of superficial velocities (usually around 5 m/s in front of the sample) are entered from the top through a monolith sample standing vertically. The solid concentration is relevant for high dust applications in coal-power plants, i.e. from 10 g/Nm$^3$-30 g/Nm$^3$. The solid particles used in the experiments are fly-ash captured by electrostatic precipitators in coal-power plants, fly-ash that is commonly added to Portland cement.

The experimental set-up consists of a fan that blows dry air (dew point at 4° C.) through an electrical heater, a screw feeder of fly-ash to an eductor where the amount fed is monitored by a weight cell and a gas cyclone after the monolith sample holder. The holder containing the monolith sample has straight walls with the necessary length to achieve a fully developed flow as has been verified by CFD simulations. The pressure drop is measured over the sample holder and the exposed monolith is monitored by weight measurements and by regular taken photographs. Image analysis is used to monitor parameters like the open frontal area of the different monoliths or simply the number of channels that are plugged.

Figure 11:
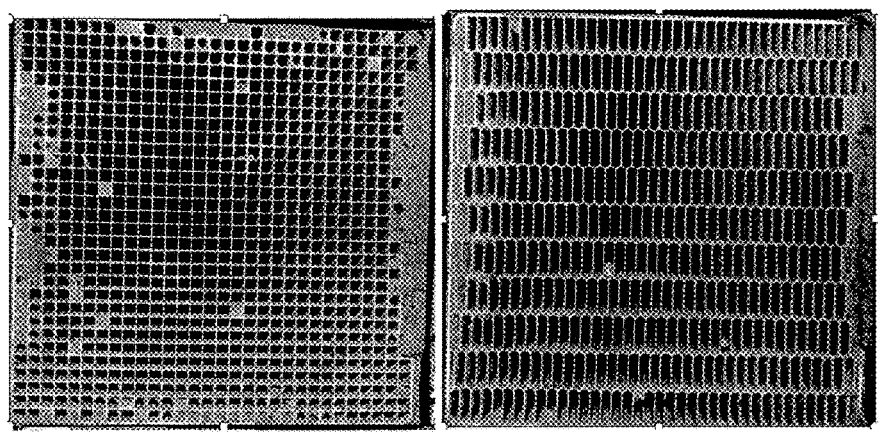
FIG. 11*a* shows a photo of the reference monolith after 48 hours exposure to fly-ash.
FIG. 11*b* shows a photo of a hexagonal monolith after 48 hours exposure to fly-ash.
FIG. 11*c* shows a graph of the open frontal area of the monoliths as a function of time.
Figure 11:
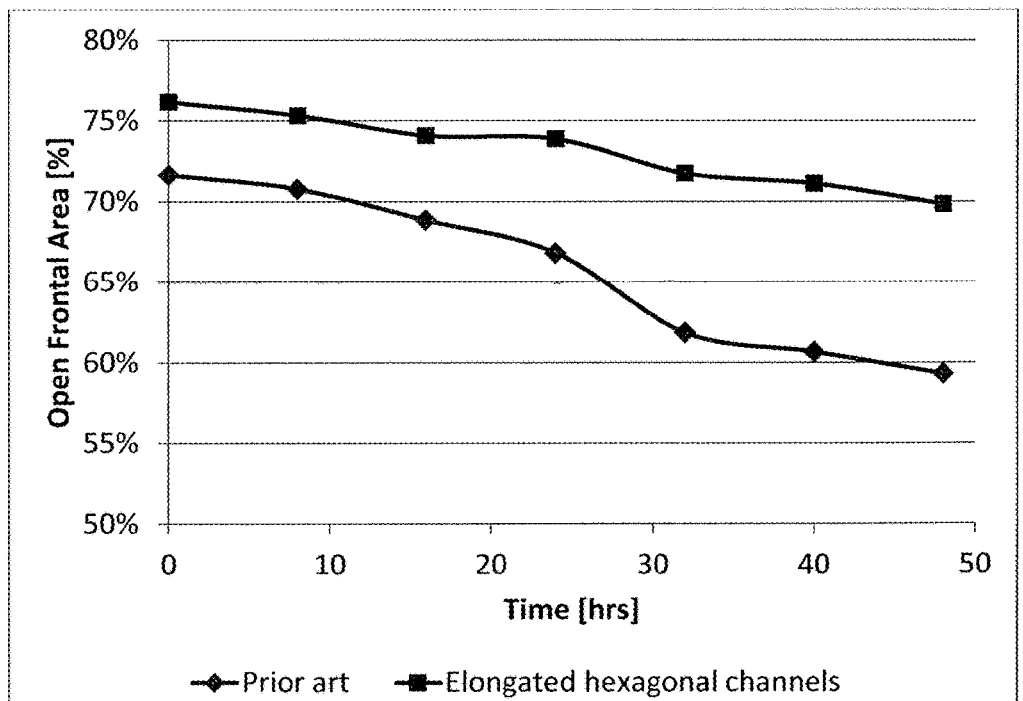

Post-analysis of the monoliths measure the depth of plugs and the amount of fouling on the monolith surfaces. The results are shown in FIG. 11c, where the open frontal area is shown as a function of time. The plugging rate is quite linear over time. The open frontal area is higher with the new design and this gives slightly lower plugging. The pictures 11a and b show the result after 48 hours.

Example 4: Pressure Drop of Monolith Tested in Pressure Drop Rig

For the measurement of pressure drop through monolith, a monolith sample is installed in a pressure drop test system. The system consists of three parts: fan, controller and measuring part. The fan is employed to gain a range of air flow rate which leads to a range of superficial velocity in front of a monolith sample. In a typical run, a monolith sample is tested for pressure drop in the range of 0 to 10 m/s in the duct which generally has the size of 15 cm by 15 cm but can be varied in terms of its monolith size to be tested. The monolith sample is placed in the measuring duct which is straight enough to achieve a fully developed flow. The controller is adjusted to achieve a predetermined gas superficial velocity. In order to confirm the gas superficial velocity, a velocity meter probe is inserted in the sampling hole located before the monolith sample. A static pressure probe is also used in the same sampling hole to measure its upstream static pressure. Downstream static pressure can be measured through another sampling hole located after the monolith sample. The differential pressure can be decided by these two static pressures. In general, the measurement is repeated with a variety of gas flow rates.

Figure 12:
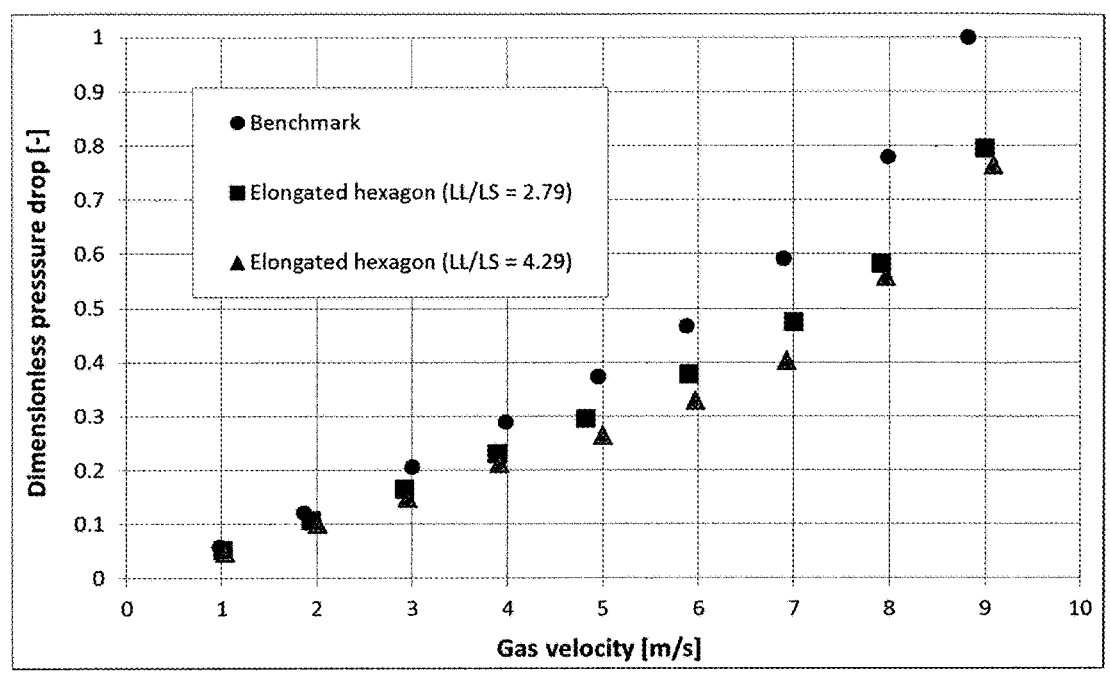
FIG. 12 shows the results from pressure drop experiments carried out with monoliths that have square or elongated hexagonal channels.

FIG. 12 shows the results from pressure drop experiments carried out with monoliths that have square or elongated hexagonal channels. The same structures and dimensions as described in Example 1 were employed but two cell diameter ratio ($L_L/L_S$), 2.79 and 4.29, were chosen for the testing of hexagonal channels. The graph shows the pressure drop as a function of the gas superficial velocity explained above. The results confirm the structural benefit of elongated hexagon, found by CFD simulations as describe in Example 1, from pressure drop point of view, compared to conventional benchmark square channel shape.

The invention claimed is:

1. A honeycomb monolith structure, comprising:
a plurality of cell walls defining a plurality of polygonal channels, the plurality of cell walls and channels extending in parallel along a common direction from an entrance end to an outlet end of the structure in a fluid flow direction and where the channels are open in both ends, wherein a transversal cross section of a polygonal channel has a convex polygon shape, wherein at least 50% of the internal angles between two adjacent walls of the convex polygon are greater than 90 degrees and wherein a cell diameter ratio $L_L/L_S$ (longest over shortest diameter) is greater than 1.5 and wherein a majority of the channels have the same flow resistance.

2. The honeycomb monolith structure according to claim 1, wherein more than 50% of the internal angles between two adjacent walls of the convex polygon shape are greater than 90 degrees.

3. The honeycomb monolith structure according to claim 1, wherein all of the internal angles between two adjacent walls of the convex polygon shape are greater than 90 degrees.

4. The honeycomb monolith structure according to claim 1, wherein the cell diameter ratio $L_L/L_S$ is between 2 and 10.

5. The honeycomb monolith structure according to claim 1, wherein the cell walls have a thickness between 0.01 and 5 mm, including the boundary values.

6. The honeycomb monolith structure according to claim 1, wherein the $L_S$ is between 0.5 and 20 mm, including the boundary values.

7. The honeycomb monolith structure according to claim 1, wherein the $L_L$ is between 0.75 and 200 mm, including the boundary values.

8. The honeycomb monolith structure according to claim 1, wherein the polygonal shape is selected from the group consisting of a pentagonal shape, a hexagonal shape, and an octagonal shape.

9. The honeycomb monolith structure according to claim 1, wherein the convex polygons are arranged in a closest packing tessellation.

10. The honeycomb monolith structure according to claim 1, which is made by extrusion of a ceramic material.

11. The honeycomb monolith structure according to claim 1, wherein at least one inside corner is rounded.

12. The honeycomb monolith structure according to claim 10, wherein a radius of curvature $L_R$ is about equal to half the smallest diameter $L_S$.

13. The honeycomb monolith structure according to claim 1, for use as a catalyst, or as a support for one or more catalysts, or as a solid for one or more non-catalytic processes, or as a support for one or more chemicals used in a non-catalytic process.

14. The honeycomb monolith structure according to claim 13, for use as a catalyst in selective catalytic reduction (SCR) of nitrogen oxides.

15. A catalyst structure, comprising the honeycomb monolith structure according to claim 1, wherein the polygonal channels of the honeycomb monolith structure have a pentagonal shape or a hexagonal shape.

16. A stacked structured reactor comprising at least two honeycomb monolith structures according to claim 1 stacked along a common flow direction.

17. The honeycomb monolith structure according to claim 4, wherein the cell diameter ratio $L_L/L_S$ is between 2 and 6.

18. The honeycomb monolith structure according to claim 4, wherein the cell diameter ratio $L_L/L_S$ is between 2.5 and 4.

19. The honeycomb monolith structure according to claim 5, wherein the cell walls have a thickness between 0.1 and 1.5 mm, including the boundary values.

20. The honeycomb monolith structure according to claim 5, wherein the cell walls have a thickness between 0.2 and 1.1 mm, including the boundary values.

21. The honeycomb monolith structure according to claim 6, wherein the $L_S$ is between 1 and 10 mm, including the boundary values.

22. The honeycomb monolith structure according to claim 6, wherein the $L_S$ is between 2 and 6 mm, including the boundary values.

23. The honeycomb monolith structure according to claim 7, wherein the $L_L$ is between 1.5 and 100 mm, including the boundary values.

24. The honeycomb monolith structure according to claim 7, wherein the $L_L$ is between 6 and 60 mm, including the boundary values.

25. The honeycomb monolith structure according to claim 10, wherein the ceramic material is a ceramic paste.

26. The honeycomb monolith structure according to claim 11, wherein all of the inside corners are rounded.

* * * * *